United States Patent
Chlus

(10) Patent No.: US 6,802,691 B2
(45) Date of Patent: Oct. 12, 2004

(54) MAINTAINABLE COMPRESSOR STABILITY BLEED SYSTEM

(75) Inventor: Wieslaw Chlus, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 66 days.

(21) Appl. No.: 10/299,634

(22) Filed: Nov. 19, 2002

(65) Prior Publication Data
US 2004/0096315 A1 May 20, 2004

(51) Int. Cl.[7] .............................................. F01D 17/12
(52) U.S. Cl. ...................................... 415/145; 415/221
(58) Field of Search ................................ 415/144, 220, 415/221, 145

(56) References Cited
U.S. PATENT DOCUMENTS 3,638,428 A * 2/1972 Shipley et al. ............. 60/226.1
6,086,326 A * 7/2000 Honda et al. ................ 415/145

* cited by examiner

Primary Examiner—F. Daniel Lopez
Assistant Examiner—Kimya N McCoy
(74) Attorney, Agent, or Firm—Bachman & LaPointe, P.C.

(57) ABSTRACT

The present invention relates to an axial flow rotary machine and to a maintainable compressor bleed system therefore. The axial flow rotary machine comprises a primary flow path for a working medium, a secondary flow path for the working medium, a bleed system for allowing a bleed portion of the working medium flowing in the primary flow path to be delivered to the secondary flow path, a support structure for the bleed system located radially inboard of the bleed system, and the panels for gaining access to the bleed system. The panels are located radially outboard of the bleed system. The panels form the inner flow wall for the primary flow path.

18 Claims, 4 Drawing Sheets

MAINTAINABLE COMPRESSOR STABILITY BLEED SYSTEM

BACKGROUND OF THE INVENTION

The present invention relates to a maintainable compressor stability bleed system for use in an axial flow rotary machine such as a gas turbine engine.

Axial flow gas turbine engines include a compression section, a combustion section, and a turbine section. A flow path for working medium gases extends through these sections of the engine. In many engines, there is a primary flow path and a secondary flow path. There is also a mechanism for bleeding working medium gases from the primary flow path to the secondary flow path.

One of the difficulties in prior art gas turbine engines is that the support structure for the working medium gas bleed system did not allow it to be penetrated for maintenance access, at least not without compromising structural integrity. As a consequence, maintenance for these bleed systems required great expense and substantial downtime.

SUMMARY OF THE INVENTION

Accordingly, it is an object of the present invention to provide an improved compressor stability bleed system.

It is a further object of the present invention to provide a bleed system as above which can be maintained more easily.

The foregoing objects are attained by the compressor stability bleed system of the present invention.

In accordance with the present invention, an axial flow rotary machine with a compressor bleed system is provided. The axial flow rotary machine broadly comprises a primary flow path for a working medium, a secondary flow path for the working medium, a bleed system for allowing a bleed portion of the working medium flowing in the primary flow path to be delivered to the secondary flow path, a support structure for the bleed system located radially inboard of the bleed system, and panels for gaining access to the bleed system. The panels are located radially outboard of the bleed system. The panels also form the inner flow wall for the primary flow path.

Other details of the maintainable compressor stability bleed system of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
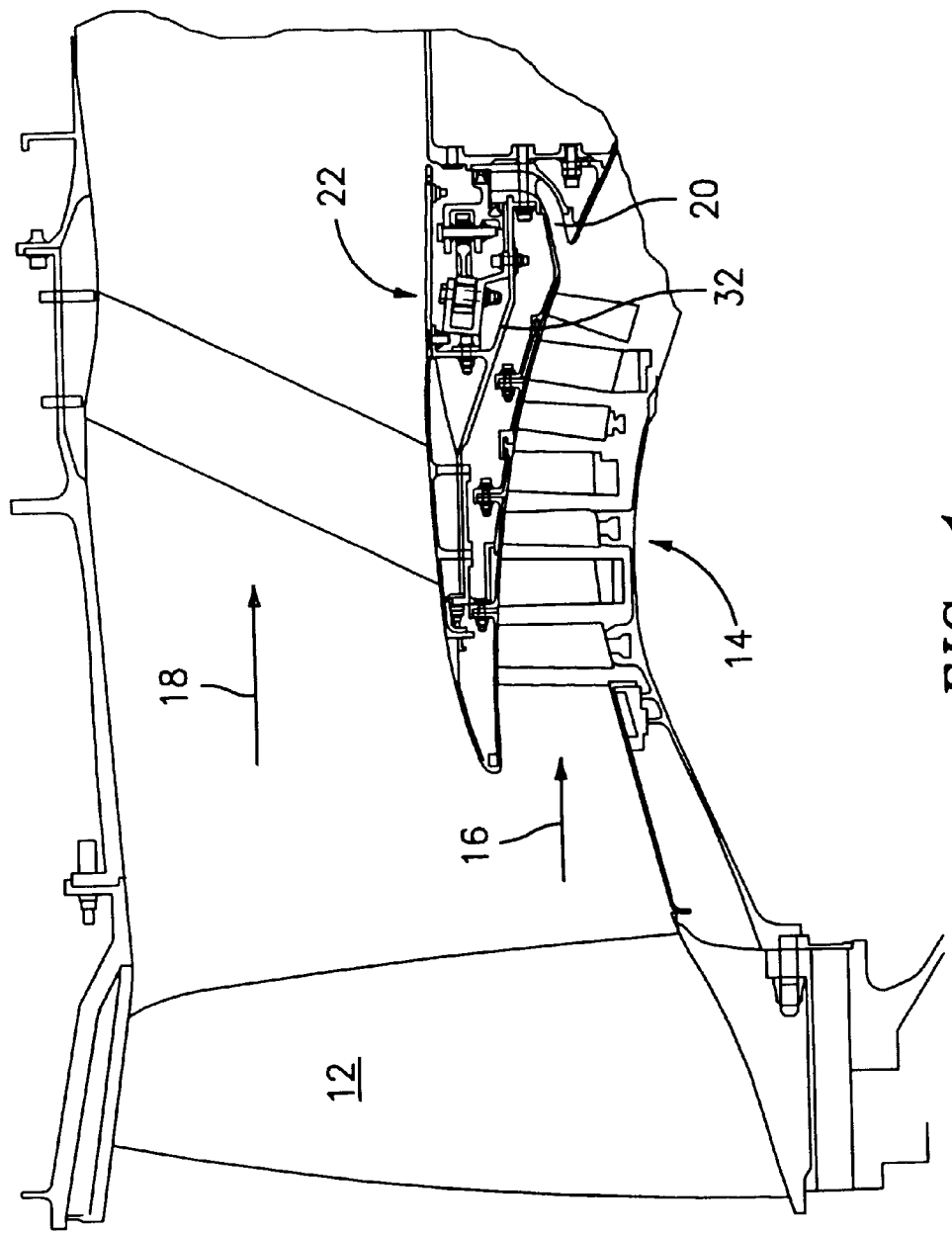
FIG. 1 illustrates a portion of a jet engine having the compressor bleed system of the present invention.

Referring now to the drawings, FIG. 1 illustrates an axial flow rotary machine, namely a gas turbine engine 10. The gas turbine engine 10 has a fan 12 and a compressor stage 14. The fan 12 introduces a working medium into the gas turbine engine 10 which has a primary flow path 16 and a secondary flow path 18. The engine 10 further includes a bleed passageway 20 for bleeding a portion of the working medium from the primary flow path 16 to the secondary flow path. A bleed system 22 is provided in the engine 10 for opening the bleed passageway 20 to allow the bleed portion of the working medium to flow from the primary flow path 16 to the secondary flow path 18 and for keeping the bleed passageway 20 closed when there is to be no working medium bled to the secondary flow path 18.

Figure 2:
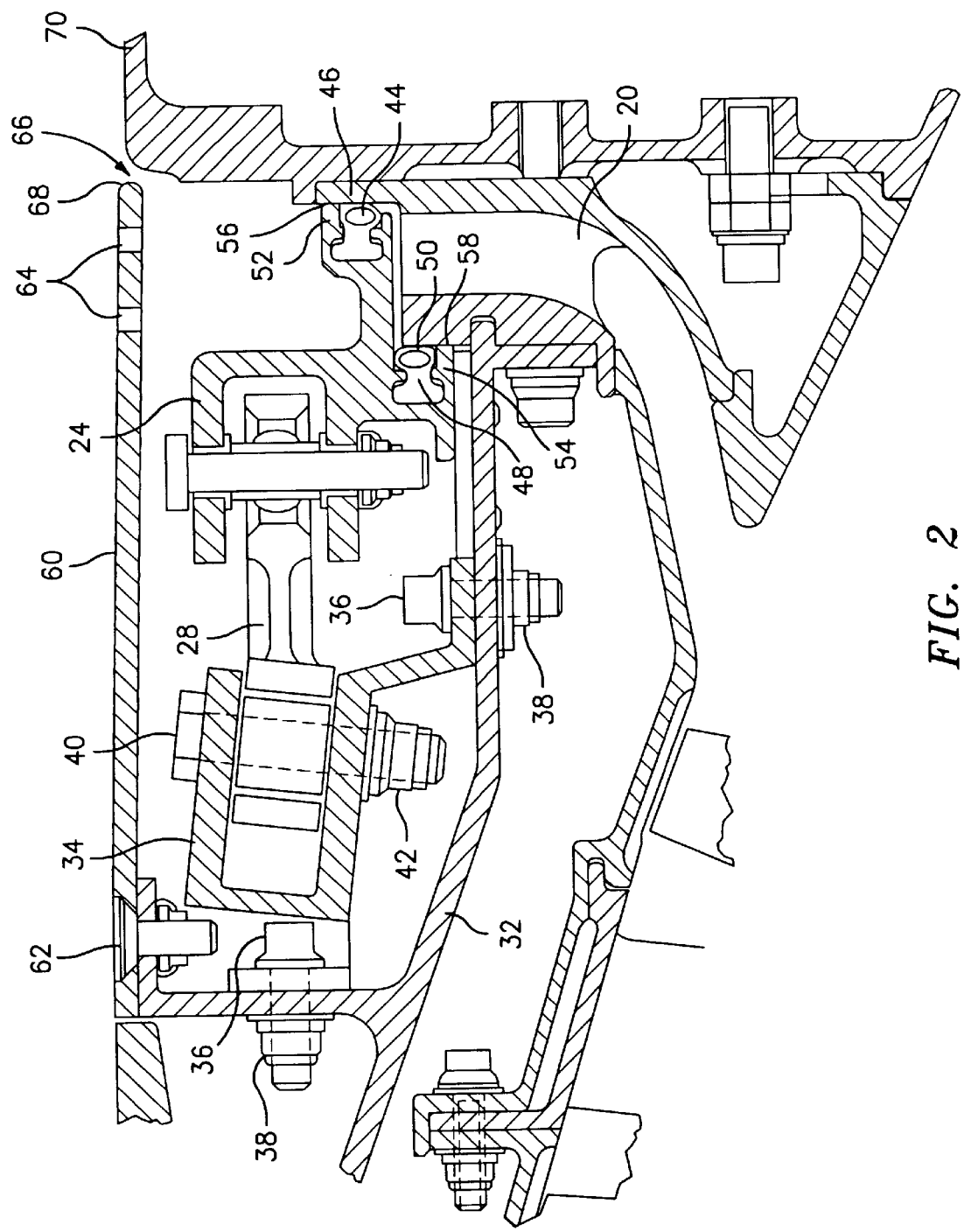
FIG. 2 is an enlarged view of the compressor bleed system of the present invention.
Figure 3:
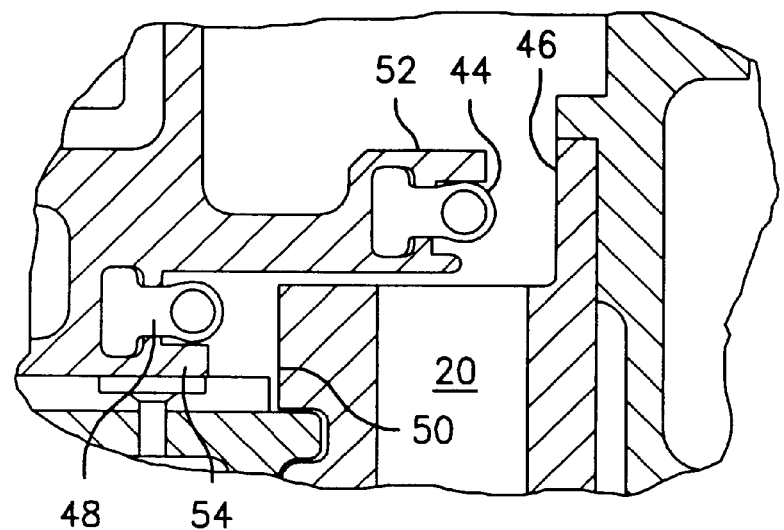
FIG. 3 is a view showing the compressor bleed system of the present invention in a partially open position.
Figure 4:
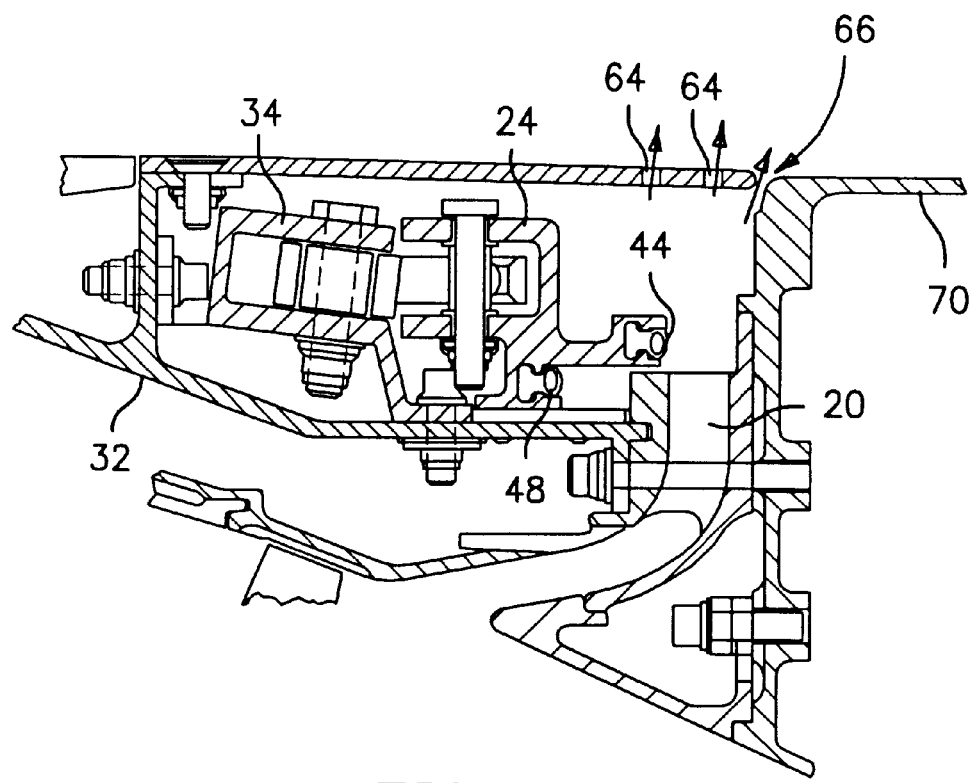
FIG. 4 is a view showing the compressor bleed system of the present invention in a fully open position.

Referring now to FIGS. 2–6, the bleed system 22 includes a bleed valve 24 which is activated by an actuator 26 for movement between the closed position shown in FIG. 2, the partially open position shown in FIG. 3, and the full open position shown in FIG. 4. The actuator 26 preferably is a constant load bleed valve actuator which eliminates the need for rigging and rerigging (adjusting and readjusting the actuator stroke position to compensate for tolerances and mechanism wear). The bleed valve 24 is connected to the actuator 26 by a linkage system containing linkages 28 and bellcrank 30. When the bleed is commanded closed, the valve 24 bottoms out (hard stop) against the bleed passageway 20. From this closed position, the open and partial open positions are calculated and set via control logic.

The linkage system is connected to and supported by the low pressure compressor support case 32, which is located radially inboard of the bleed system 22. The linkage system is connected to the case 32 via support bracket 34 and fasteners 36 and nuts 38. The support bracket 34 and the linkage 28 may be connected together by any suitable means known in the art such as fastener 40 and nut 42.

The valve 24 includes a first seal 44 which abuts against a first contact surface 46 of the bleed passageway 20 and a second seal 48 which abuts against a second contact surface 50 of the bleed passageway 20 when the valve 24 is in a closed position. The valve 24 further has extended lips 52 and 54 which cover side surfaces of first and second seals 44 and 48 respectively. The first extended lip 52 sufficiently covers the side surfaces of the first seal 44 to prevent curling up of the first seal 44. The second extended lip 54 sufficiently covers the side surfaces of the second seal 48 to prevent curling up of the second seal 48. Preventing curling up of the seals 44 and 48 is important from the standpoint of avoiding changing the bleed flow and circumferential uniformity during valve partial open operation. The extended lips 52 and 54 prevent the seals 44 and 48 from being completely crushed. As a result, the seals 44 and 48 act like "O" rings for effective sealing.

The contact surfaces 56 and 58 of the lips 52 and 54 respectively are hardfaced for wear resistance. Similarly, the contact surfaces 46 and 50 are hardfaced. It is also desirable to impregnate the contact surfaces 46 and 50 with a lubricating material, such as TEFLON, to prevent wear of the seals 44 and 48. One technique for making the surfaces 46, 50, 56 and 58 hardfaced is set forth in AMS Spec. 2482A. Using the technique described therein, a hard, TEFLON-impregnated or co-deposited Teflon-aluminum oxide coating may be formed on the surfaces 46, 50, 56 and 58. Alternately, a hardened anodized aluminum oxide coating may be formed on the surfaces 46, 50, 56 and/or 58. The seals 44 and 48 may be made out of any suitable material known in the art.

Figure 5:
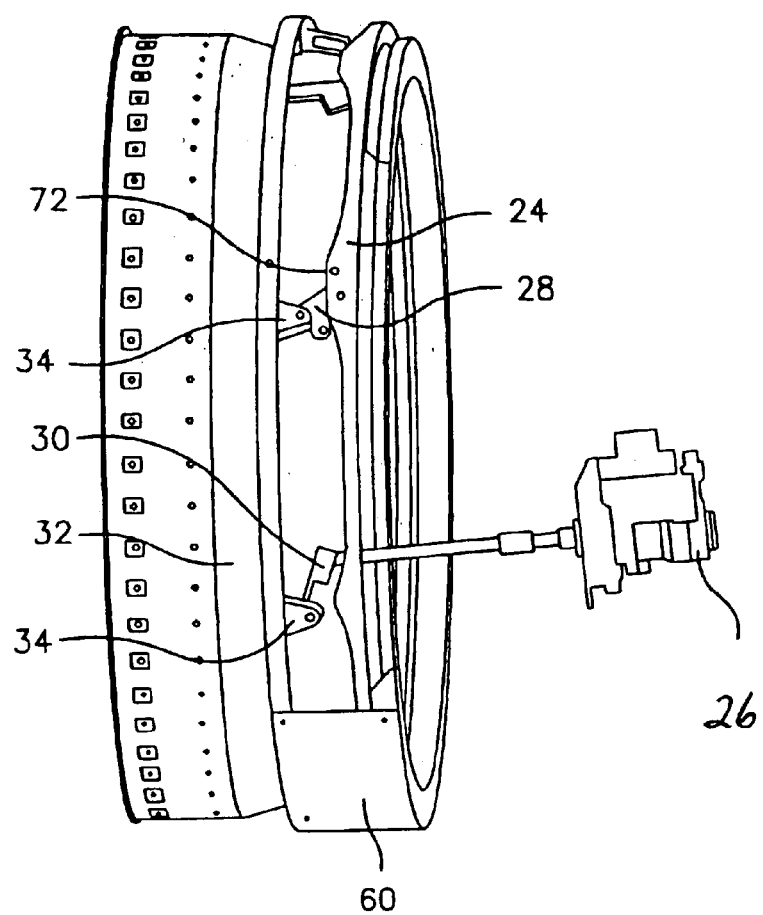
FIG. 5 is a side view of a portion of the engine of FIG. 1 showing the actuator for the valve mechanism in the bleed system of the present invention.
Figure 6:
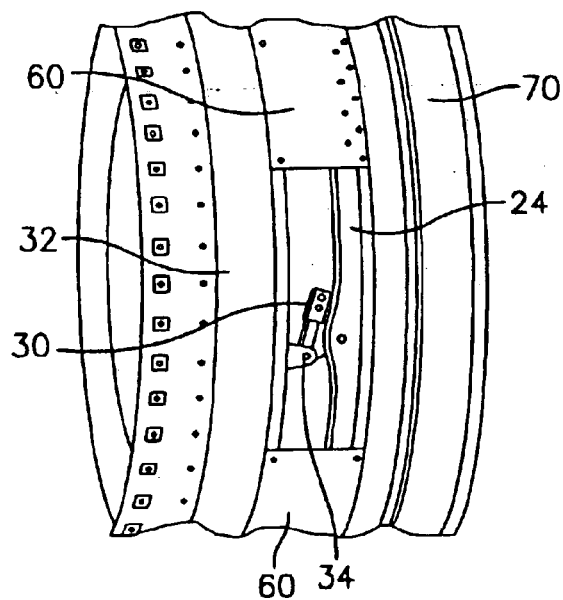
FIG. 6 is a perspective view of a portion of the engine of FIG. 1 showing one of the access panels removed.

In order to gain access to the valve 24, the linkage 28, the bellcrank 30, and the support bracket 34, a removable access panel 60 is provided. The access panels 60 may be secured to the low pressure compressor support case 32 via one or more removable fasteners 62 and, as can be seen from FIG. 2, is located radially outboard of the bleed system 22. The panels also form the inner flow wall for the primary flow path. The access panels 60 has at least one port 64, preferably a plurality of ports 64, for allowing working medium bled from the primary flow path to be delivered to the secondary flow path. FIGS. 5 and 6 illustrate the access to the valve 24, the support structure 34, the linkage 28 and the bell crank 30 when the panel 60 is removed.

Referring now to FIG. 2, a slot 66 is created between a rear edge 68 of the panel 60 and the intermediate compressor casing 70. The slot 66 also allows working medium bled from the primary flow path 16 to be delivered to the secondary flow path 18.

By incorporating the bleed system 22 and the bleed valve 24 on the outer diameter of the low pressure compressor support case 32, maintenance of the bleed system components and valve components can be more easily carried out. These components do wear due to numerous actuations during engine operation, i.e. opening and closing of the bleed valve 24 to maintain compressor stability. The bleed system of the present invention allows on-wing access and replacement of parts such as the linkages 28, bellcrank 30, support brackets 32, dampers 72, and seals 44 and 48 without disassembling the engine. Access can be gained to the bleed components simply by removing each of the panels 60 from the rear of the intermediate case 70.

It is apparent that there has been provided in accordance with the present invention a maintainable compressor stability bleed system which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations which fall within the broad scope of the appended claims.

What is claimed is:

1. An axial flow rotary machine comprising:
    a primary flow path for a working medium;
    a secondary flow path for said working medium;
    a bleed system for allowing a bleed portion of the working medium flowing in said primary flow path to be delivered to said secondary flow path;
    a support structure for said bleed system located radially inboard of said bleed system; and
    a panel for gaining access to said bleed system, said panel being located radially outboard of said bleed system.

2. The machine of claim 1, further comprising:
    a bleed passageway connected to said primary flowpath; and
    said bleed system including a valve for closing said bleed passageway in a first position and for opening said bleed passageway in a second position.

3. The machine of claim 2, further comprising:
    said bleed system having a linkage system for operating said valve; and
    an actuator for operating said linkage system.

4. The machine of claim 2, wherein said bleed passageway has a first contact surface and said valve includes a first seal which seats against said first contact surface.

5. The machine of claim 4, wherein said bleed passageway has a second contact surface and said valve includes a second seal which seats against said second contact surface.

6. The machine of claim 5, wherein said valve further has a first extended lip which sufficiently covers side surfaces of said first seal to prevent curling up of said first seal and a second extended lip which sufficiently covers side surfaces of said second seal to prevent curling up of said second seal.

7. The machine of claim 6, wherein each contact surface of said first and second extended lips is hardfaced for wear resistance and wherein each contact surface of said passageway is hardfaced and impregnated with a lubricating material.

8. The machine of claim 1, wherein said access panel has at least one port for allowing at least some of said bleed portion of the working medium to be delivered to said secondary flow path.

9. The machine of claim 8, further comprising a casing having an edge spaced from a rear edge of said access panel and forming a slot with said rear edge of said access panel to allow at least some of said bleed portion of the working medium to be delivered into said secondary flow path.

10. The machine of claim 1, wherein said support structure comprises a low pressure compressor support case.

11. The machine of claim 1, wherein said machine is a gas turbine engine.

12. A bleed system for use in a gas turbine engine for opening and closing a bleed passageway which allows a working medium to flow from a primary flow path to a secondary flow path, said bleed system comprising:
    a bleed valve movable between a first position where said bleed passageway is closed and a second position where said bleed passageway is open;
    actuation means for moving said bleed valve between said first position and said second position;
    said actuation means being supported by a support structure;
    said valve and said actuation means being located radially outboard of said support structure; and
    a removable access panel secured to said support structure.

13. A bleed system according to claim 12, wherein said actuation means includes at least one linkage and a bellcrank and wherein said at least one linkage is secured to said support structure by at least one support bracket.

14. A bleed system according to claim 12, wherein said bleed valve has a first seal for contacting a first contact surface of said bleed passageway when said valve is in said closed position and a first extended lip covering side surfaces of said first seal to prevent curling up of said first seal.

15. A bleed system according to claim 14, wherein said bleed valve has a second seal for contacting a second contact surface of said bleed passageway when said valve is in a closed position and a second extended lip covering side surfaces of said second seal to prevent curling up of said second seal.

16. A bleed system according to claim 12, wherein said access panel has a plurality of ports which allow a portion of the working medium to be delivered to said secondary flow path.

17. A bleed system according to claim 12, wherein said access panel is spaced from an adjacent edge of an adjacent structure so as to form a slot through which the working medium can be delivered to said secondary flow path.

18. A bleed system according to claim 12, wherein said actuation means includes a constant load bleed valve actuator.

* * * * *